United States Patent

Kokolis

[11] Patent Number: 5,318,170
[45] Date of Patent: Jun. 7, 1994

[54] CATENARY RIGID TOP TROUGHING ASSEMBLY-OFFSET

[75] Inventor: Edward N. Kokolis, 1502 Woodland Rd., Indiana, Pa. 15701

[73] Assignee: Edward N. Kokolis, Indiana, Pa.

[21] Appl. No.: 93,334

[22] Filed: Jun. 25, 1993

Related U.S. Application Data

[63] Continuation-in-part of Ser. No. 944,273, Sep. 14, 1992.

[51] Int. Cl.$^5$ .............................................. B65G 15/08
[52] U.S. Cl. ................................... 198/825; 198/827; 198/828; 198/830
[58] Field of Search ................ 198/825, 827, 828, 830

[56] References Cited

U.S. PATENT DOCUMENTS

| | | | |
|---|---|---|---|
| 2,889,918 | 6/1959 | Bergmann | 198/825 |
| 2,971,233 | 2/1961 | Presti et al. | 198/825 |
| 3,219,174 | 11/1965 | Eckhardt et al. | 198/828 |
| 3,219,177 | 11/1965 | Reilly | 198/827 |
| 3,327,838 | 6/1967 | Jonker | 198/825 |
| 4,936,443 | 6/1990 | East | 198/827 |
| 5,027,940 | 7/1991 | Woodward | 198/829 |

FOREIGN PATENT DOCUMENTS

| | | | |
|---|---|---|---|
| 6511628 | 3/1966 | Netherlands | 198/825 |
| 183667 | 6/1966 | U.S.S.R. | 198/825 |
| 952094 | 3/1964 | United Kingdom | 198/827 |

*Primary Examiner*—D. Glenn Dayoan
*Assistant Examiner*—Cheryl L. Gastineau

[57] ABSTRACT

Catenary rigid top troughing assemblies guide and support the top, or load carrying portion of a flexible belt conveyor system. Each unit includes a centrally located, formed cross member. Attached at each end of the cross member is a saddle, which rigidly mounts or affixes the cross member to the siderails. The saddles have slotted mounting holes to allow the assembly to be pivoted for proper belt training. Handles are attached to the saddles for lifting on or off of the siderails. Roller mounting brackets are rigidly attached to the cross member to position three rollers into a appropriate troughing arrangement. The two outside or wing rollers are mounted on one side of the cross member, while the third, or center roller is mounted on the other side.

1 Claim, 2 Drawing Sheets

CATENARY RIGID TOP TROUGHING ASSEMBLY-OFFSET

This is a continuation-in-part of application Ser. No. 07/944,273 filed Sep. 14, 1992, pending.

BACKGROUND OF THE INVENTION

Conveyor systems have four primary components; a drive, a tail or discharge section, a flexible conveyor belt, and the conveyor belt structure.

The present invention relates to the conveyor belt structure, and more particularly, to a rigid top troughing assembly for a catenary conveyor belt structure.

Conveyor belt structures are used to guide and support conveyor belts as they convey material. Commonly, conveyor structures are mounted overhead or on the floor. Catenary structure has become a generic term representing the type of conveyor belt structure as to be described. This system is comprised of four major components; the stand(s), siderails, return rollers(s), and top troughing assemblies. The stand is a weldment used to rigidly mount the return roller(s) and siderails. The return rollers rotate about their axis and support the return belt. The siderails provide a rigid mounting framework for the top troughing assemblies. The top troughing assembly is a series of three idlers which rotate about their axis, interconnected to one another. The two outer idlers are generally called wing rollers, and the center idler is appropriately referred to as the center roller. The wing rollers have a hook affixed to one end to facilitate attachment to the siderails while the other end is manufactured in such a fashion as to accept a coupling link. The coupling link connects two wing rollers with a single center roller to form a top troughing assembly.

In use, the top troughing assemblies carry the conveyor belt loaded with media between the drive and the discharge point. And although the catenary top troughing assembly has provided an easily installed and relatively inexpensive design to manufacture, industry demands of higher load carrying capacities have pushed this design to the limit.

The catenary top troughing idler is seated into a bracket mounted on the siderail. While this bracket is sufficient to stop the top troughing assembly from sliding along the siderails, it does not rigidly secure the assembly to maintain the axis of the rollers perpendicular to the belt. As the loads increase, the center roller of the top troughing assembly is pushed in the direction of the belt travel, bringing the wing rollers out of perpendicularity with the belt. This top troughing assembly must also maintain a clearance between the edges of the idlers because of the inline nature. Under heavy offset loading of the belt, the clearance between one edge of the center idler and an edge of a wing roller become narrow, conversely the opposite end of the center roller and the other wing roller become wider, inherent with the hinging effect of the coupling link. This results in a reduced troughing area as well as creating a possibility for the conveyor belt to be pulled through the wider gap created between the center and wing roller. The load placed on top of these top troughing assemblies is supported by the bearing journals of shafts. Since they interconnect, the center roller shaft must carry a larger percentage of the load, thus reducing the load carrying capacity of the troughing assembly.

SUMMARY OF PRESENT INVENTION

The present invention is particularly directed toward the existing catenary systems as well as providing a new upgrade version.

Generally, the present invention will replace standard catenary top troughing assemblies already installed in the field, allowing a higher load carrying capacity without having to modify, change out, or replace the existing siderails, stands, or return rollers. The present invention may also be installed as a new system using the industry standard siderails, 2¾" or 3" diameter tubing, as well as 2½" pipe. C-Channel, square or rectangular tubing could also be used as a suitable siderail or support.

In the present invention, an inverted formed angle iron, or suitable structural material, referred to as the cross member, would be secured to the siderails by means of a saddle attached to each end. The cross member can be formed to any angle depending on the material to be conveyed, as this angle sets the troughing angle at which the rollers will trough the belt. The saddles are formed to install readily onto the siderails. The saddle will also have a slot through which a bolt may secure the assembly to the siderail, and provide adjustment to properly train the belt. Handles will also be installed onto the saddles to ease in loading or unloading the assembly on or off of the siderails. Roller mounting brackets are rigidly mounted to the cross member. The roller mounting brackets are installed to allow the wing or outside rollers to be mounted on one side and the center roller to be mounted to the other side of the cross member.

In use, the present invention will carry the conveyor belt loaded with media between the drive and the discharge point. The present invention is seated onto the siderails and positively secured by installing a bolt through the saddle and siderail and securing with a nut. This rigidly affixes the cross member to which the rollers are mounted. The cross member is constructed of a suitable structural material so as not to be influenced by the load of the media being conveyed. The roller mounting brackets are installed to allow the wing or outside rollers to be mounted on one side of the cross member and the center roller to the other. By using this offset method of installing the rollers, the gap or pinch points can be eliminated by overlapping the rollers. In the present invention, the rollers have been referred to as either wing rollers or center roller for clarity, when in fact all three rollers will be manufactured with the same exterior specifications.

DESCRIPTION OF ILLUSTRATED EMBODIMENT

Figure 1:
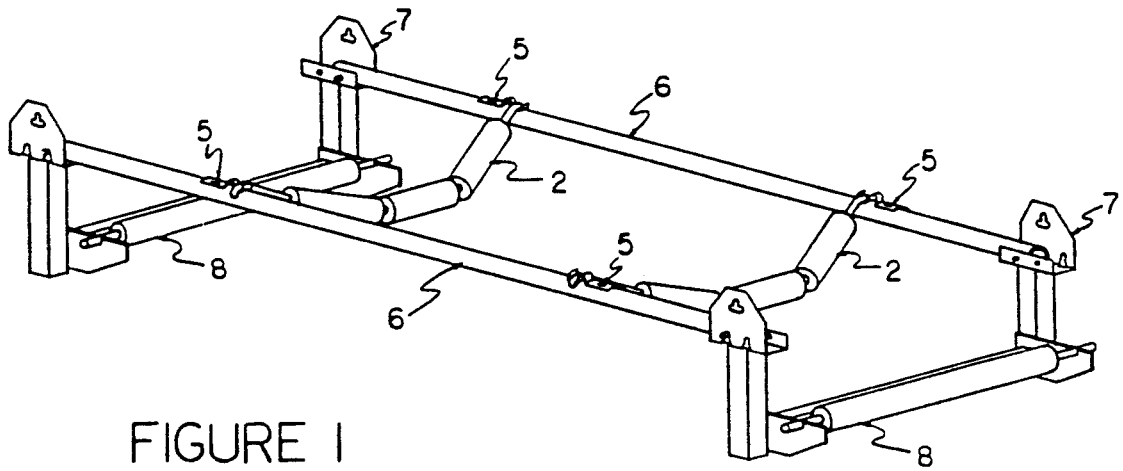
FIG. 1 is a pictorial view of a typical prior art catenary roof mounted structure.

Referring to FIG. 1 illustrates a section of typical prior art catenary roof mounted structure. This section is generally 8'–10' long with the catenary top troughing assemblies FIG. 2 spaced between 4'–5' on center. The top troughing assemblies are seated into the siderail brackets 5 which are mounted to the siderail 6. The siderails are supported by the stands 7 which also support the return rollers 8.

Figure 2:
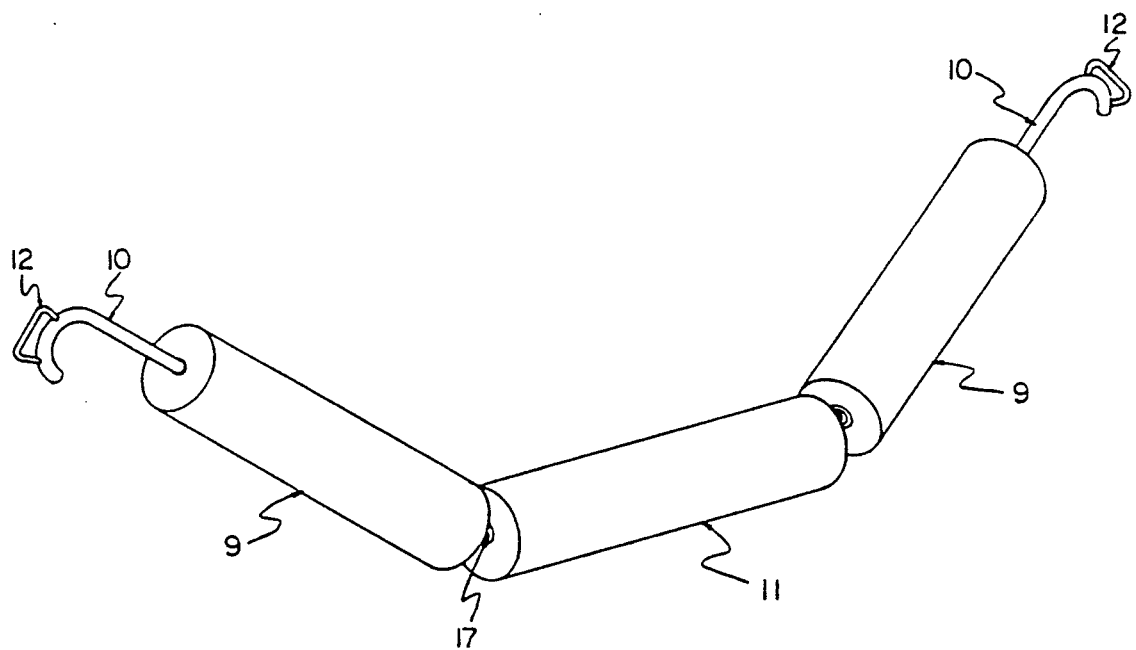
FIG. 2 is a pictorial view of a typical prior art catenary top troughing assembly.

This section can be repeated as many times as necessary to provide the required length for a particular system. FIG. 2 shows a typical prior art catenary top troughing assembly 2. This assembly is comprised of two wing rollers 9 which have hooks 10 on one end for mounting onto the siderail brackets 5, the other ends are manufactured to accept a coupling link 17. The center roller 11 attached to the coupling links joining the wing rollers with the center rollers to form the assembly. Handles 12 have been added to this assembly to ease installation.

Figure 3:
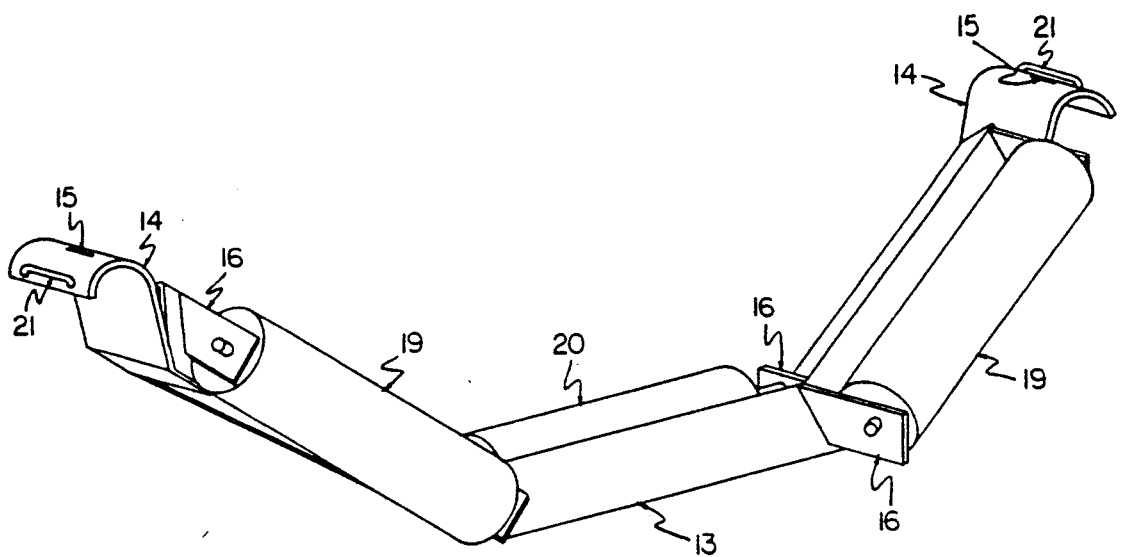
FIG. 3 is a pictorial view of the present invention.
Figure 4:
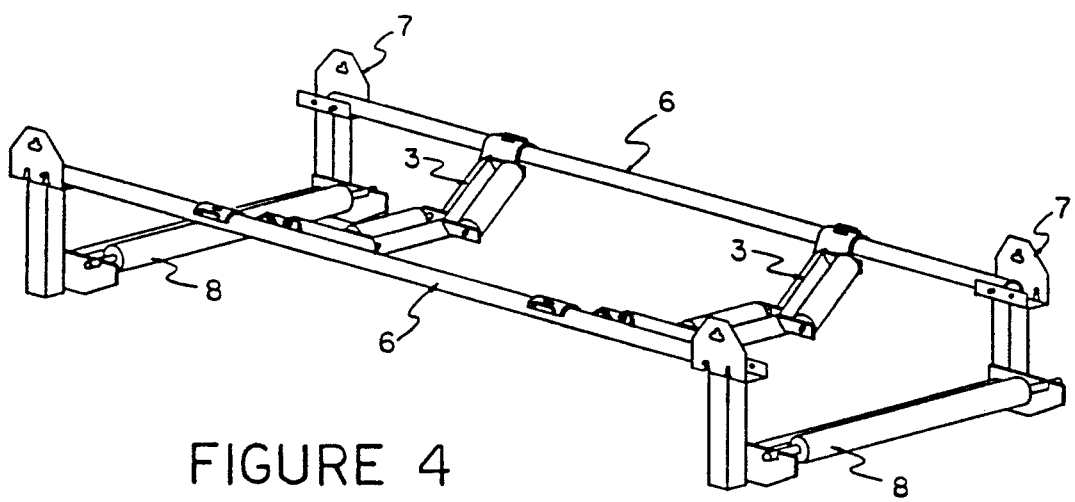
FIG. 4 is a pictorial view of the present invention as installed on a section of catenary structure.

The present invention as illustrated in FIG. 3 replaces the catenary top troughing assembly. It will also be mounted in similar type structure. FIG. 4 shows a typical roof mounted structure with the present invention 3 installed.

In the present invention, an inverted formed angle iron, or suitable structural material, referred to as a cross member 13, would be secured to the siderails 6, by way of saddles 14 having handles 21 attached to each end of the cross member. The cross member can be formed to any angle depending on the material to be conveyed, as this angle sets the troughing angle at which the rollers will trough the belt. The saddles can be securely attached to the siderails by installing a bolt through a slot 15 in the saddle and through the siderail and securing with a nut. The slot provides an adjustment to "train" the belt. Roller mounting brackets 16 attach to the cross member to accept the rollers. The two outside or wing rollers 19 are mounted to one side of the cross member and the center roller 20 is mounted on the other. By using this offset method of installing the rollers, the gap or pinch points can be eliminated by overlapping the rollers. In the present invention, the rollers have been referred to as either wing rollers 19 or center roller 20 for clarity, when in fact all three rollers will be manufactured with the same exterior specifications.

I claim:

1. A conveyor apparatus comprising of frame structure means for moving a flexible conveyor belt across said structure means, a plurality of belt supporting catenary rigid top troughing assemblies longitudinally spaced along the length of the belt engaging and supporting said belt to a generally trough shaped support, with each of said catenary rigid top troughing assemblies consisting of a formed cross member, which defines the shape of the trough, a pair of saddles attached at either end to provide a means to affix said cross member securely to an existing siderail of the frame structure, said saddles are provided with slotted holes to provide training and handles to aid in the ease of installation, roller mounting brackets are rigidly attached to said cross member to position three rollers into a desired troughing shape, with the two outside or wing rollers mounted on one side of the said cross member, and the third or center roller mounted on the other side.

* * * * *

REEXAMINATION CERTIFICATE (2641st)

United States Patent [19]

Kokolis

[11] B1 5,318,170
[45] Certificate Issued Jul. 25, 1995

[54] CATENARY RIGID TOP TROUGHING ASSEMBLY-OFFSET

[75] Inventor: Edward N. Kokolis, 1502 Woodland Rd., Indiana, Pa. 15701

[73] Assignee: Edward N. Kokolis, Indiana, Pa.

Reexamination Request:
No. 90/003,549, Sep. 1, 1994

Reexamination Certificate for:
Patent No.: 5,318,170
Issued: Jun. 7, 1994
Appl. No.: 93,334
Filed: Jun. 25, 1993

Related U.S. Application Data

[63] Continuation of Ser. No. 944,273, Sep. 14, 1992, abandoned.

[51] Int. Cl.$^6$ ............................................. B65G 15/08
[52] U.S. Cl. ...................................... 198/825; 198/827
[58] Field of Search ............... 198/825, 827, 828, 830, 198/840

[56] References Cited

U.S. PATENT DOCUMENTS

| | | | |
|---|---|---|---|
| 3,219,174 | 11/1965 | Eckhardt et al. | 198/825 |
| 3,327,838 | 6/1967 | Jonker | 198/825 |
| 4,475,648 | 10/1984 | Weeks | 198/830 |

FOREIGN PATENT DOCUMENTS

| | | | |
|---|---|---|---|
| 6511628 | 3/1966 | Netherlands | 198/825 |
| 183667 | 6/1966 | U.S.S.R. | 198/825 |

OTHER PUBLICATIONS

1990 Long-Airdox Company Brochure entitled "Belt Conveyor Systems: Intermediate Sections," Bulletin No. 104.

1990 Long-Airdox Company Brochure entitled "(RFM) Rigid Frame, Modular Tailpiece," Bulletin No. 305.

1980 Long-Airdox Company Brochure entitled "Conveyor Systems: Tail Sections," Bulletin No. 105.

*Primary Examiner*—Joseph E. Valenza

[57] ABSTRACT

Catenary rigid top troughing assemblies guide and support the top, or load carrying portion of a flexible belt conveyor system. Each unit includes a centrally located, formed cross member. Attached at each end of the cross member is a saddle, which rigidly mounts or affixes the cross member to the siderails. The saddles have slotted mounting holes to allow the assembly to be pivoted for proper belt training. Handles are attached to the saddles for lifting on or off the siderails. Roller mounting brackets are rigidly attached to the cross member to position three rollers into an appropriate troughing arrangement. The two outside or wing rollers are mounted on one side of the cross member, while the third, or center roller is mounted on the other side.

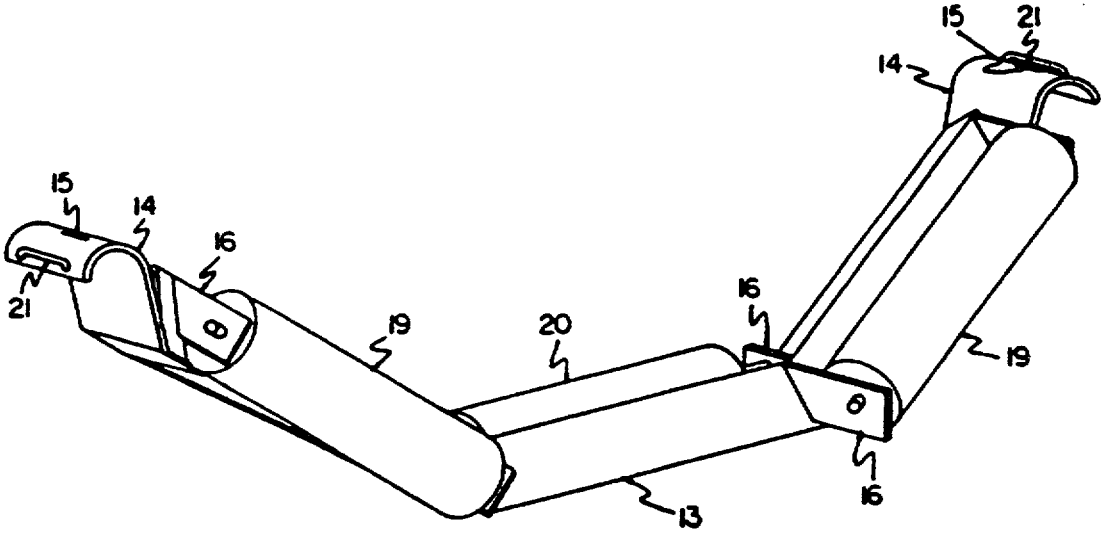

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claim 1 is confirmed.

* * * * *